United States Patent [19]

Meyer

[11] 4,387,344
[45] Jun. 7, 1983

[54] PHOTON STORAGE TUBE HIGH POWER LASER SYSTEM

[75] Inventor: Thomas W. Meyer, Albuquerque, N. Mex.

[73] Assignee: The United States of America as represented by the Secretary of the Air Force, Washington, D.C.

[21] Appl. No.: 225,556

[22] Filed: Jan. 16, 1981

[51] Int. Cl.³ ............................................. A01S 3/05
[52] U.S. Cl. .................................. 330/4.3; 332/7.51; 372/97; 372/94
[58] Field of Search .............. 331/94.5 C, 94.5 D, 331/94.5 P; 330/4.3; 332/7.51; 372/14, 24, 93, 94, 97, DIG. 700

[56] References Cited

U.S. PATENT DOCUMENTS

| | | | |
|---|---|---|---|
| 3,497,826 | 2/1970 | Foster | 372/97 |
| 3,646,469 | 2/1972 | Buczeh et al. | 330/4.3 |
| 3,668,536 | 6/1974 | Micbar | 330/4.3 |
| 3,702,973 | 11/1972 | Daugherty et al. | 331/94.5 PE |
| 3,711,791 | 1/1973 | Erickson | 372/13 |
| 3,753,152 | 8/1973 | Pettifrece | 330/4.3 |
| 3,766,393 | 10/1973 | Herzog et al. | 372/97 |
| 3,855,544 | 12/1974 | Bowness | 331/94.5 C |
| 3,872,407 | 3/1975 | Hughes | 331/94.5 C |
| 3,886,480 | 5/1975 | Vali et al. | 331/94.5 C |
| 3,969,684 | 7/1976 | Witte et al. | 372/25 |
| 3,986,129 | 10/1976 | Coffo et al. | 331/94.5 C |
| 4,001,705 | 1/1977 | Sinclair et al. | 330/4.3 |
| 4,053,849 | 10/1977 | Gould | 331/94.5 P |
| 4,093,924 | 6/1978 | Farcy | 330/4.3 |
| 4,167,666 | 9/1979 | Miller et al. | 250/216 |
| 4,191,928 | 3/1980 | Emmett | 330/4.3 |
| 4,292,602 | 9/1981 | Bergquist | 372/94 |
| 4,302,730 | 11/1981 | Jernigan | 372/97 |

OTHER PUBLICATIONS

Berlashov et al., "Laboratory Laser Oscillator... Resonator", 6/76, Inst. & Exper. Tech., vol. 19, #3, Pt. 2, p. 827-827.

Primary Examiner—Nelson Moskowitz
Attorney, Agent, or Firm—Donald J. Singer; Jacob N. Erlich

[57] ABSTRACT

A photon storage tube high power laser system having a repetitively pulsed or pumped laser therein and a photon storage tube. An initial pulse of electromagnetic radiation generated by the repetitively pulsed laser is directed into the storage tube for storage until amplified by redirection through the gain medium of the repetitively pulsed laser. As a result of appropriate adjustment of related focusing optics the repetitively pulsed laser acts only as a gain medium after the initial pulse generation. Continued storage and amplification of the initial pulse produces a high energy pulse of electromagnetic radiation which is subsequently output from the system.

10 Claims, 12 Drawing Figures

PHOTON STORAGE TUBE HIGH POWER LASER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to high energy lasers, and, more particularly, to a laser system which incorporates therein a photon storage tube in order to increase the output pulse of a small repetitively pulsed laser into a high energy laser pulse.

Since the development of the first working lasers, considerable time and effort has been expended in the search for high power laser systems. The possible applications of high power lasers are unlimited in the fields of communication, manufacturing, construction, medicine, space exploration, energy, and defense.

The gas laser has grown out of the initial laser effort and is representative of one of the more sophisticated laser techniques which has the capability of providing very high power radiation output, due primarily to the large gas handling capability characteristic of such systems and due to the large quantity of energy which can be added to the gases flowing in such systems.

Unfortunately the larger the output energy pulse the larger, more complex, and costly the requirement for the laser system. In addition, with such large laser systems, the gain therein is so high that control of parasitic oscillations, which lead to runaway lasing in the devices, is an extremely severe problem.

Consequently, it is readily apparent that there exists the need for a high power pulsed laser which eliminates the problems associated with such high power lasers of the past.

SUMMARY OF THE INVENTION

The instant invention overcomes the problems encountered in the past by providing a photon storage tube high power laser system which is capable of effectively increasing the output of a small repetitively pulsed laser by providing within the laser system a photon storage tube which allows for the buildup of very high energy pulses.

The high power laser system of this invention incorporates therein the use of a small repetitively pulsed or pumped laser, preferably in the form of an electric discharge laser, appropriate beam directing passageways or tubes, focusing optics and a photon storage tube. The photon storage tube is formed of an elongated vacuum tube having reflective elements at each end thereof. The photon tube is optically aligned with the repetitively pulsed laser and receives therefrom the input source of electromagnetic pulses.

Within the high power laser system of this invention an initial pulse of electromagnetic radiation is generated by the repetitively pulsed or pumped laser. This pulse of energy is directed into the photon storage tube by appropriate focusing optics. The pulse is retroreflected within the storage tube until the time at which the laser is again pumped. Thereafter, due to appropriate adjustment and alignment of one of the reflective elements forming the resonant cavity of the laser, the laser merely acts as a gain medium for the initial pulse.

The initial pulse is directed through the laser gain medium where it is amplified and reinserted within the photon storage tube for subsequent retrieval. The energy pulse is retrieved and passed once again through the gain medium simultaneously with the next pump of the laser. This procedure is repeated in coincidence with each pump of the repetitively pulsed laser. At a point at which the total pulse energy has reached the desired high energy level, it is directed, by means of an appropriate adjustment of the reflective element, from the system as a high energy output pulse.

In addition, further embodiments of this invention include a modified photon storage tube which allows for a shorter length of the tube by the utilization of a plurality of mirrors or reflective surfaces at each end of the tube. Such an arrangement provides additional time for the switchout mechanism of this invention to function.

Furthermore, it is possible with this invention, to store within the storage tube output pulses from a plurality of repetitively pumped lasers. This is achieved by a rotating reflector having surfaces having different angular relationships. The surfaces are aligned such that each face directs the beams to and from its associated laser.

It is therefore an object of this invention to provide a high power laser system which incorporates therein a photon storage tube to increase the output power thereof.

It is another object of this invention to provide a photon storage tube high power laser system which is substantially reduced in size from the high power laser systems of the past.

It is a further object of this invention to provide a photon storage tube high power laser system which is substantially less complex than the high power laser systems of the past.

It is still a further object of this invention to provide a photon storage tube high power laser system which eliminates the parasitic oscillations associated with high power lasers of the past.

It is still another object of this invention to provide a photon storage tube high power laser system which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENTS

Figure 1:
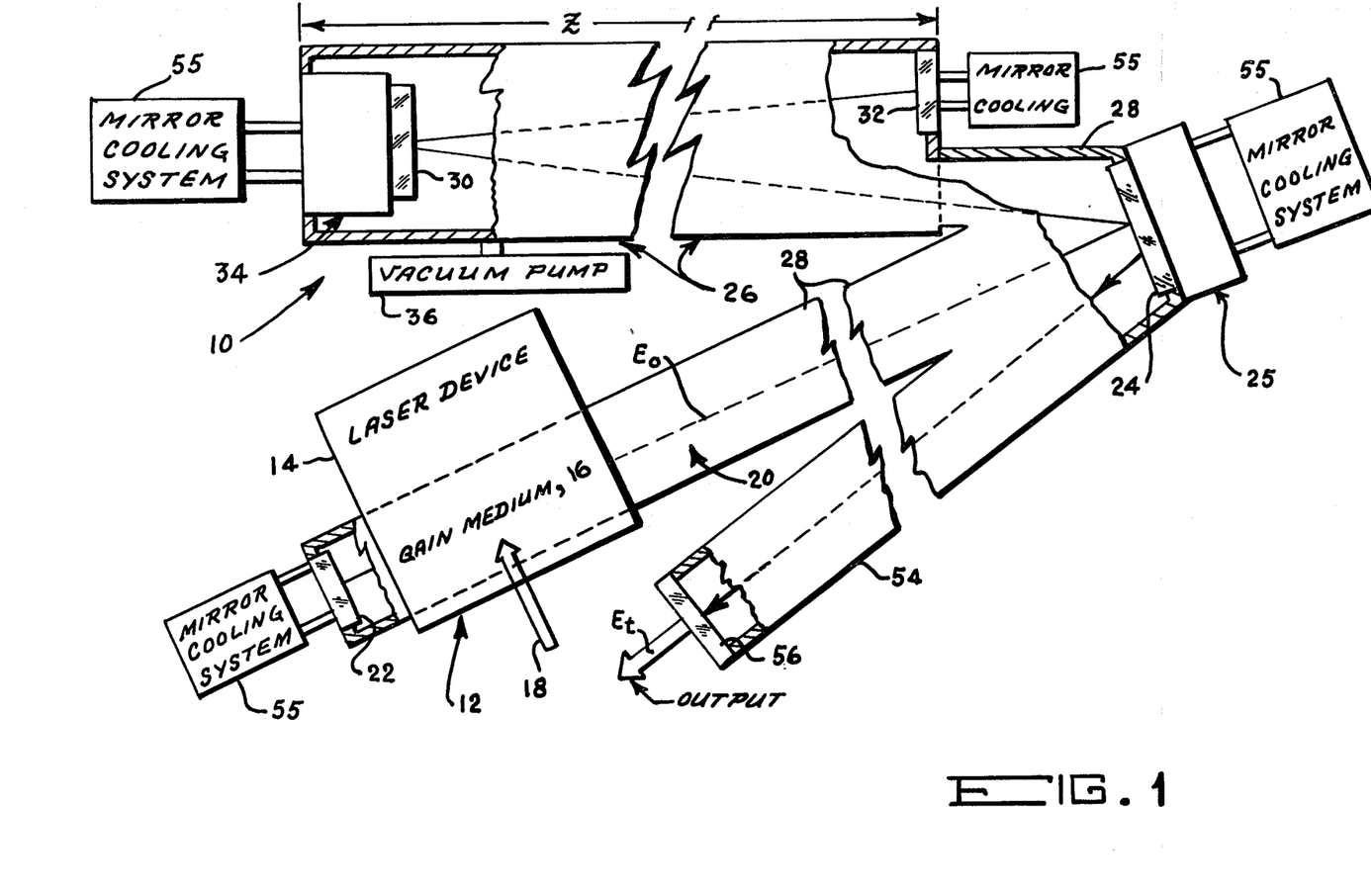
FIG. 1 is a schematically illustrated side elevational view of the photon storage tube high power laser system of this invention and shown partly in cross-section.

Reference is now made to FIG. 1 of the drawing, which illustrates schematically the photon storage tube high power laser system of 10 of this invention. Laser system 10 incorporates therein any conventional low output repetitively pulsed or pumped lasing device in the form of, for example, a $CO_2$ gas electric discharge laser 12. A typical output pulse from laser 12 may be, for example, 30 joules.

As depicted in FIG. 1 of the drawing, electric discharge laser 12 includes a housing 14 through which a gaseous gain medium 16 passes, any suitable pumping means in the form of, for example, a repetitive electron beam 18 emanating from any suitable source such as an electron gun (not shown) and a resonant cavity 20 bounded at each end by a pair of reflective elements in the form of, for example, mirrors 22 and 24 in a manner to be described in detail hereinbelow.

Electric discharge laser 12 is conventional in its operation and utilizes electron beam 18 repetitively fired into the gaseous gain medium 16 within resonant cavity 20 so as to ionize a fraction of the gas 16 to provide free electrons. These electrons are subject to the sustainer voltage which adds energy to them, heating them to a desired temperature. In the case of the $CO_2$ laser 12, the electrons transfer some of their energy to $N_2$ and $CO_2$ in resonant cavity 20 by collision processes, pumping the gases to an upper laser energy level. The $N_2$ transfers its vibrationally excited energy to the $CO_2$. The $CO_2$ relaxes to a lower level by the emission of radiation. Mirrors 22 and 24, which bound cavity 20, reflect some of the stimulated emission back into gain medium 16 stimulating more emission, etc. This radiation in the form of a pulse of electromagnetic radiation is directed by means of an adjustable reflector assembly 25 which includes mirror 24 (more clearly illustrated in FIG. 2) into a photon storage tube 26 optically aligned therewith. Interconnection between housing 14, adjustable reflector assembly 25 and storage tube 26 is accomplished by means of tubular passageways 28.

Photon storage tube 26 is an elongated, evacuated tubular element made, preferably of stainless steel, and having situated at each end thereof reflecting elements in the form of, for example, mirrors 30 and 32. Mirror 30 is included as part of adjustable reflector assembly 34, similar to the adjustable assembly 25 associated with mirror 24. Photon storage tube 26 is evacuated by any conventional vacuum pump 36 operably attached thereto. The length of storage tube 26 is designated as z.

Figure 2:
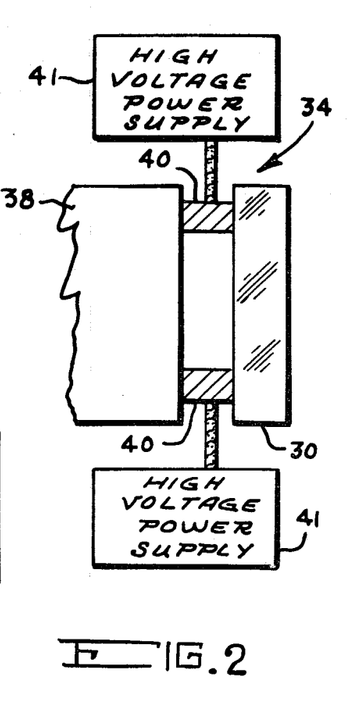
FIG. 2 is a side elevational view of a the adjustable reflector assembly utilized with the photon storage tube high power laser system of this invention and shown partly in cross-section.

Reference is now made to FIG. 2 of the drawing for a more detailed description of adjustable reflector assembly 34. Since adjustable reflector assembly is 25 substantially identical to adjustable reflector assembly 34, the description below will be made with respect to only one such assembly, assembly 34. More specifically, adjustable reflector assembly 34 is made up of mirror 30 mounted upon a stationary support structure 38 by a plurality of piezoelectric stacking elements 40. Any suitable high voltage power supplies 41 are electrically connected in a conventional manner to piezoelectric stacking elements 40. By the appropriate application of current thereto, piezoelectric elements 40 can be altered in length thereby varying the position of mirror 30 (24). The adjustment of mirror 30 (24) by means of adjustable reflector assembly 34 (25) alters the angle of reflection of mirror 30 (24) in a manner described in detail hereinbelow.

Figures 3, 4:
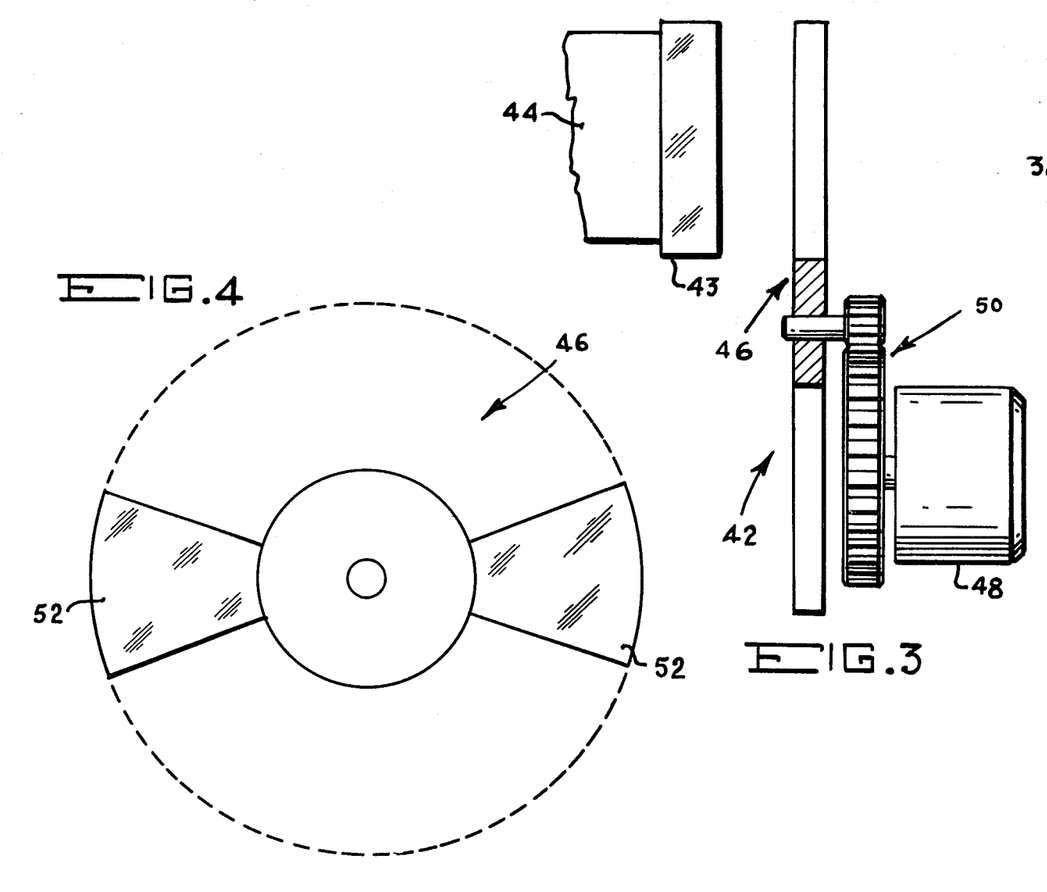
FIG. 3 is a side elevational view of a rotating chopper which may be utilized in place of the adjustable reflector assembly within the photon storage tube high power laser system of this invention and shown partly in cross section.
FIG. 4 is a front view showing a portion of the mirrored surfaces of the rotating chopper of FIG. 3 of the photon storage tube high power laser system of this invention and shown partly in cross-section.

Although piezoelectric adjustable reflector assemblies 25 and 34 are preferred with this invention, other types of devices capable of changing the path of a beam can be utilized with this invention. An example of another such device would be a switching reflector assembly 42 illustrated in FIG. 3 of the drawing. Switching reflector assembly 42 includes a mirror 43 fixedly mounted upon support 44 and a reflective chopper wheel 46 rotatably mounted adjacent thereto. Any suitable drive mechanism such as motor 48 and gear arrangement 50 rotates chopper wheel 46 at a preselected speed. Reflective chopper wheel 46 includes a pair of mirrored surfaces 52 as illustrated in FIG. 4 of the drawing disposed at a preselected angle. Consequently, the pulse of radiant energy, at preselected time intervals, strikes and reflects either off mirror 43 or mirrored surfaces 52 depending upon the position of chopper wheel 46. Switching reflector assembly 42, may be used in place of adjustable assembly 34, and, with minor modification in place of adjustable assembly 25.

The major design considerations of this invention are the reflectivity, R, of mirrors 22, 24, 30 and 32, the wavelengths, $\lambda$, and the repetition rate (PRF) at which laser 12 is pumped by electron beam 18, and the length, z, of the evacuated photon storage tube 26.

Referring once again to FIG. 1 of the drawing, in addition to the tubular passageways 28 between housing 14, reflector assembly 25 and storage tube 26, laser system 10 of this invention includes a tubular output passageway 54 situated adjacent and in optical alignment with mirror 24. Cooling of the mirrors and mirror assemblies utilized with this invention are conventional and are designated as cooling systems 55 throughout the specification. An output window 56 located at the end of output passageway 54 seals and completes laser system 10.

During operation of the high power laser system of this invention, a pulse of energy $E_o$ is introduced by laser 12 into photon storage tube 26 by means of appropriate adjustment of mirror 24. Prior thereto, and as a result of its initial adjustment, mirror 24 was optically aligned with mirror 22 so as to form a resonant cavity 20 between mirrors 22 and 24. Upon subsequent adjustment of mirror 24 into alignment with mirror 30, mirrors 22 and 24 no longer form a resonant cavity. However, the pulse of energy $E_o$ is directed from mirror 24 into storage tube 26 and onto mirror 30 within storage tube 26. Mirror 30 is adjusted so as to direct this pulse of energy to mirror 32. Thereafter pulse $E_o$ is retroreflected or bounced between mirrors 30 and 32 within storage tube 26.

Simultaneously with the next pump of laser 12 by electron beam 18, mirror 30 is readjusted to direct the initial pulse of energy $E_o$ back to mirror 24 and through gain medium 16. Since resonant cavity 20 was essentially destroyed by the prior positioning of mirror 24, the initial pulse of energy $E_o$ is amplified within gain medium 16. Thereafter, pulse $E_o$ is reinserted within photon storage tube 26.

Input and output of this pulse of energy between photon storage tube 26 and laser gain medium 16 continues until the total pulse energy of the initial pulse has reached its desired level of output, for example, 10,000 joules. At this point mirror 24 is adjusted so as to output this pulse of energy through output passageway 54 as a high power laser pulse output. Thereafter, mirror 24 can be readjusted to complete resonant cavity 20 and a a new pulse of energy can be formed by laser 12.

Upon introduction of the pulse of energy $E_o$ into the photon storage tube 26, the pulse of energy $E_o$ loses energy as it is reflected between mirrors 30 and 32. This loss is $E_o(1-R)$ per bounce. If photon storage tube 26 has a very high vacuum ($10^{-8}$ torr) and if the mirrors 30 and 32 are figured properly then diffraction, absorption, and scattering losses should be essentially negligible.

Therefore, if after some number of bounces (N) between mirrors 30 and 32, the pulse of energy $E_o$ is redirected into the gain region 16 and this is done for i number of repetitions of the pumping pulse from electron beam 18, then after the i th repetition the energy $E_t$ output from the laser system 10 of this invention will be $$E_t = E_o + E_o L^1 + \cdots E_o L^i \quad (1)$$

In equation (1) L is the loss factor for a pulse of energy which has made N bounces in storage tube 26 and is determined by the following equation:

$$L = R^N \quad (2)$$

This factor simply gives the energy remaining in a pulse of initial energy $E_o$ after N reflections from a mirror of reflectivity R.

Equation (1) is an infinite series which has the limit $$E_t = E_o/(1-L) \quad (3)$$

From equation (2) the higher the mirror reflectivity and the fewer the number of bounces, the closer the loss factor will be to one. Fewer bounces means larger tube length (z). From equation (3) it can be seen that the closer L is to one the higher the total pulse energy ($E_t$) which may be stored in photon storage tube 26.

To give a practical example of the operation of this invention, assume the use of a repetitively pulsed carbon dioxide gas electric laser 12 operating at a wavelength of 10.6 microns. Typical mirror reflectances at this wave length using dielectric coatings are approximately 99.8%. If we choose a photon storage tube of 5 kilometers in length then the number of bounces in tube 26 between each laser pulse is $$N = c/z(PRF) = 5.9978 \times 10^4 / PRF \quad (4)$$

where c is the speed of light ($2.998 \times 10^8$ m/sec), and PRF is the laser pulse repetition frequency.

Pulse rates over 10,000 pulses per second have been successfully demonstrated in supersonic $CO_2$ electric discharge lasers. Therefore, if we use a PRF of 10,000 in equation (4) we see that the number of bounces is $$N \approx 6$$

The loss factor (equation (2)) is therefore $$L = (0.998)^6 = 0.988$$

The maximum total pulse energy which can be output from laser system 12 of this invention (equation (3)) is $$E_t = E_o/(1-0.988) = 83 \, E_o \quad (5)$$

If we wish to output a 10,000 joule pulse then the single pulse energy required from repetitivly pulsed laser 12 would only be $$E_o = 10,000/83 = 121 \text{ joules.}$$

Higher mirror reflectances can substantially reduce the single pulse power required. For example, if the mirrors in the photon storage tube 26 discussed above (z=5 Km, N=6) had a reflectance of 99.95% (which can now be achieved in the visible wavelengths) then the maximum total pulse energy from equation (3) is $$E_o = E_o/(1-0.007) = 334 \, E_o.$$

With this reflectance the single pulse energy for a 10,000 joule pulse would only be 30 joules (10,000/334).

The requirements for switching the pulse in and out of storage tube 26 by piezoelectric adjustable reflector assembly 34 are readily achievable. Using the above example of a 5 kilometer storage tube 26, the round trip time (t) for the pulse is $$t = 2z/c = 33.3 \text{ microseconds}$$

Reference is now made to the further embodiments of this invention clearly illustrated in FIGS. 5-9 of the drawing. Since many of the elements utilized in all the embodiments of this invention are identical to the elements utililized with laser system 10 shown in FIG. 1, for ease of understanding of this invention, elements which are identical will be given the same reference numerals in all Figures of the drawing.

Figures 5, 6:
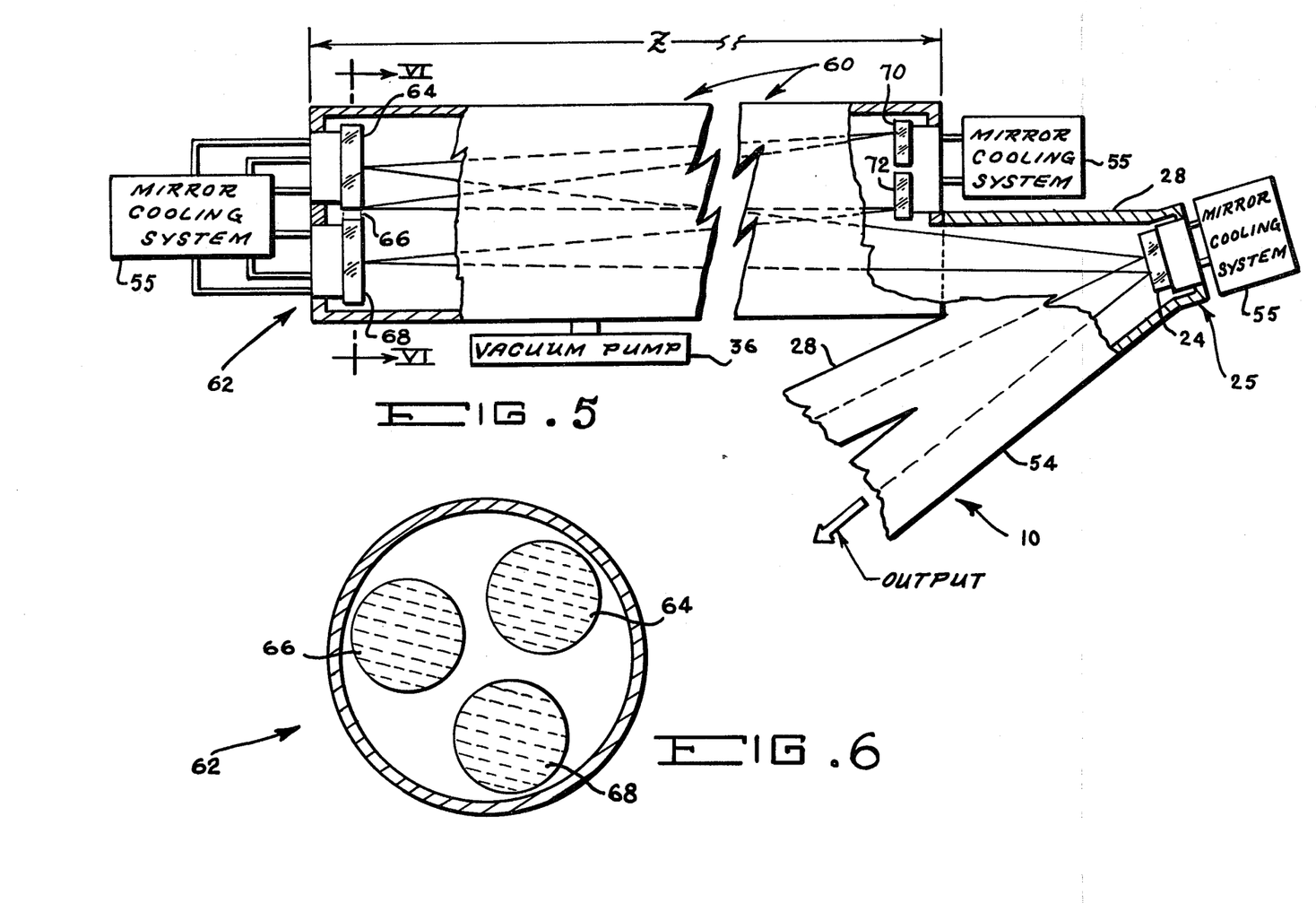
FIG. 5 is a schematically illustrated side elevational view of an alternate embodiment of the photon storage tube utilized with the high power laser system of this invention and shown partly in cross-section.
FIG. 6 is a cross sectional view taken along line VI—VI of FIG. 5.

Attention is now directed to FIG. 5 of the drawing which schematically illustrates an alternate embodiment of the photon storage tube 60 of the high power laser system 10 of the invention. Storage tube 60 can be substituted for storage tube 26 which is clearly illustrated within the high power laser system 10 of this invention in FIG. 1 of the drawing. The alternate embodiment depicted in FIG. 5 allows for a shorter storage tube length z to be used and/or allows more time to return the initial laser pulse back through the gain medium 16.

Within photon storage tube 60, reflective assembly 34 is replaced with a reflective assembly 62 which incorporates therein a plurality of reflective elements in the form of mirrors 64, 66 and 68. Mirrors 64, 66 and 68 are more clearly illustrated in FIG. 6 of the drawing. In addition, mirror 32 is replaced by a pair of reflective elements in the form of mirrors 70 and 72. As with photon storage tube 26 depicted in FIG. 1 of the drawing, mirror cooling is performed by any conventional cooling system 55 operably connected to reflective assembly 62 and reflective elements 70 and 72, respectively.

During operation of laser system 10 utilizing photon storage tube 60 therein, mirrors 24, 64, 66, 68, 70 and 72 are aligned such that an input pulse generated by laser 12 reflected by mirror 24 is directed toward mirrors 64, 70, 66, 72 and 68, in that order, before being redirected back to mirror 24 and from there through gain medium 16. Utilizing this scheme, six transits of storage tube 60 may be made for the same length tube as depicted in FIG. 1 of the drawing before the beam is redirected by mirror 68 back through gain medium 16. This allows more time for switching the initial pulse out of storage tube 60. The remaining operation of the embodiment of this invention illustrated in FIG. 5 of the drawing is identical to that described hereinabove with respect to photon storage tube high power laser system 10 depicted in FIG. 1 of the drawing.

It is also possible with this invention to store many pulses of electromagnetic radiation within the photon storage tube by spacially separating each of the pulses. Thus, the total pulse energy output of the laser system of this invention can be increased by using a plurality of repetitively pulsed lasers to inject energy into the storage tube. Such a feature is desirable when it is necessary to reduce the output power required from each laser or, if the high energy stored in a single pulse would damage the mirrors of the storage tube.

Figure 7:
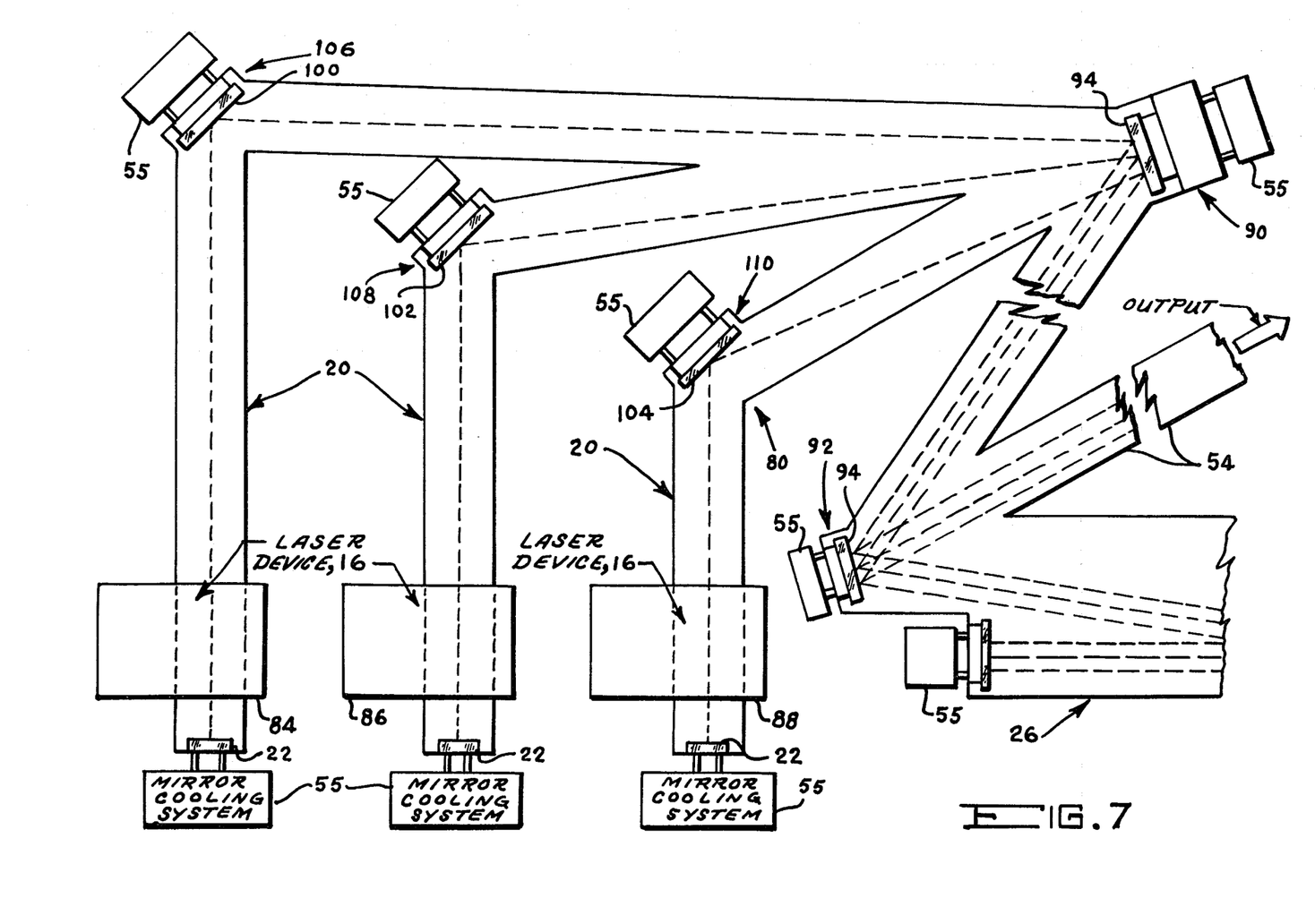
FIG. 7 is a schematically illustrated side elevational view of an alternate embodiment of the photon storage tube high power laser system of this invention.
Figure 8:
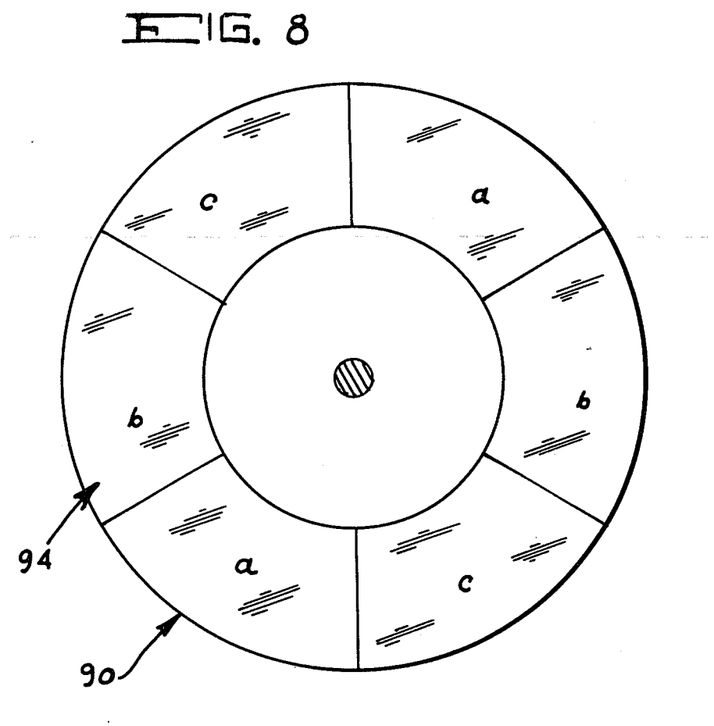
FIG. 8 is a front view of the directing mechanism utilized with the photon storage tube high power laser system of this invention depicted in FIG. 7.
Figure 9A:
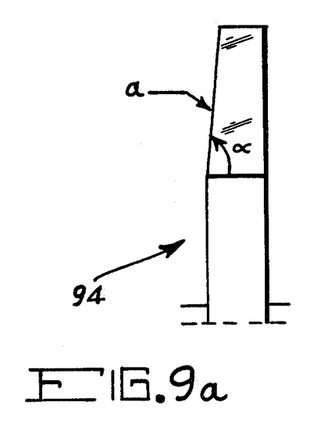
FIGS. 9a, 9b and 9c are cross-sectional views of the various surfaces utilized in the directing mechanism depicted in FIG. 7 of the photon storage tube high power laser system of this invention.
Figure 9B:
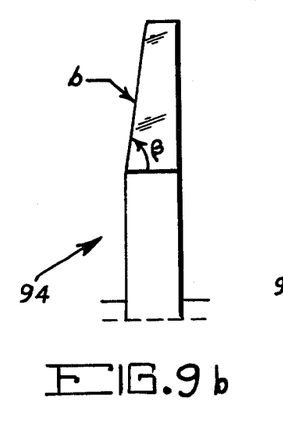
Figure 9C:
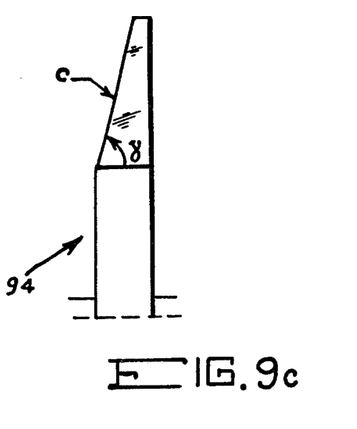

FIG. 7 of the drawing illustrates an alternate embodiment of the photon storage tube high power laser system 80 of this invention in which multiple pulses can be stored within a single storage tube 26 of type described with respect to FIG. 1 of the drawing. The embodiment illustrated in FIG. 7 of the drawing relies upon three repetitively pulsed lasers 84, 86 and 88, although other numbers of lasers can be utilized with appropriate modification of this system of the invention. As stated above, for purposes of ease of understanding of this aspect of the invention elements already described in detail and also utilized in laser system 80 shown in FIG. 7 will be given identical numerals to those elements found in FIG. 1 of the drawing.

Still referring to FIG. 7 of the drawing, repetitively pulsed or pumped lasers 84, 86 and 88 are representative of three gas electric discharge lasers of the type depicted in FIG. 1 of the drawing as electric discharge laser 12. In order for high power laser system 80 to operate, this embodiment of the invention contains therein a multiple directing reflector assembly 90 more clearly illustrated in FIG. 8 of the drawing. Directing assembly 90 is capable of directing the input and output pulses from the three lasers 84, 86 and 88, respectively, into and out of photon storage tube 26. Reflective assembly 92 is adjustable in the fashion of adjustable assembly 34 in order to output pulses from the system.

It is therefore necessary to now refer to FIGS. 7, 8 and 9a, 9b and 9c of the drawing to more specifically describe the multiple directing reflective assembly 90 utilized in this invention. Multiple reflective assembly 90 is made up of a rotating disk 94 which includes on the face thereof a plurality of reflective surfaces designated as a, b and c. Each surface or mirror a, b and c is aligned at a different angle with respect to the other such that these angles $\alpha$, $\beta$ and $\gamma$ respectively, will direct the individual and spacially separated pulses from lasers 84, 86 and 88 into and out of the photon storage tube 26. By synchronizing the rate of rotation of disk 94 with the timing of pulses emanating from lasers 84, 86 and 88, individual pulses, following different optical paths may be directed into and out of storage tube 26.

Since reflective assembly 92 is also adjustable, mirrored disk 94 associated therewith is capable of being adjusted so as to direct pulses either into or out of photon storage tube 26 or to output a large pulse from system 80. The large output pulse is formed by the combination of the three pulses. This can be accomplished by means of conventional beam combining optics (not shown) located within output passageway 54.

Mirrors 100, 102 and 104 are formed as part of adjustable reflective assemblies 106, 108 and 110 and are similar to the adjustable reflective assemblies 25 and 34 set forth with respect to FIG. 1 of the drawing. It is the function of mirrors 100, 102 and 104 to act not only as the end mirrors for the resonant cavities 20 of lasers 84, 86 and 88, but also upon appropriate adjustment to direct the initial laser pulse from each of lasers 84, 86 and 88, respectively, to the multiple directing assemblies 90 and 92 for redirection either into the photon tube 26, back into the gain medium 16 of lasers 84, 86 and 88 or as an output from system 80.

The high power laser system 80 depicted in FIG. 7 of the drawing operates in an identical fashion to the high power laser system 10 depicted in FIG. 1 and therefore a complete discussion of its operation is unnecessary. It must be realized that the high power laser system 80 of FIG. 7 is capable of using a plurality of repetitively pulsed lasers in order to produce, with a minimum power output from each of these lasers, a high energy output pulse.

Although this invention has been described with reference to particular embodiments, it will be understood to those skilled in the art that this invention is also capable of further and other embodiments within the spirit and scope of the appended claims. For example, rather than passing the initial pulse back through the gain medium as described hereinabove, it would also be possible to synchronously add each new pulse to the total pulse within the photon storage tube by the use of appropriate beam splitters. However, such a system may be slightly less efficient than the system set forth in detail hereinabove.

I claim:

1. A photon storage tube high power laser system comprising means containing a gain medium for producing a pulse of electromagnetic radiation; means operably connected to said electromagnetic radiation producing means and separated therefrom for storing said pulse of electromagnetic radiation therein for a predetermined period of time, said electromagnetic radiation producing means including adjustable means positioned at one end thereof for reflecting said pulse of electromagnetic radiation into said electromagnetic storage means, back through gain medium, and out of said high power laser system at alternate times; and said electromagnetic storage means including at least two means in optical alignment with each other for receiving said pulse of electromagnetic radiation from said adjustable reflective means and reflecting therebetween said pulse of electromagnetic radiation, at least one of said reflecting means of said storage means being capable of redirecting said pulse of electromagnetic radiation at said predetermined period of time from said electromagnetic radiation storage means to said adjustable reflective means forming part of said electromagnetic radiation producing means; whereby said adjustable reflective means can either redirect said pulse of electromagnetic radiation through said gain medium or out of said high power laser system as a pulse of high power electromagnetic radiation.

2. A photon storage tube high power laser system as defined in claim 1 wherein said electromagnetic radiation producing means comprises a housing, said housing containing said gain medium therein, a reflective element located at one end of said housing and said adjustable reflective means located at the other end of said housing, said reflective element and said adjustable reflective means forming a resonant cavity therebetween when said adjustable reflective means is adjusted so as to be in optical alignment with and substantially parallel to said reflective element, and means for repetitively pumping said gain medium at predetermined intervals.

3. A photon storage tube high power laser system as defined in claim 2 wherein said predetermined period of time is substantially equal to the time between said predetermined pumping intervals of said means for repetitively pumping said gain medium of said electromagnetic pulse producing means.

4. A photon storage tube high power laser system as defined in claim 2 wherein said reflecting means for directing said pulse of electromagnetic radiation out of said electromagnetic storage means comprises a stationary support, a mirror, at least one piezoelectric element interconnecting said mirror to said support and means for controlling the size of said piezoelectric element in order to alter the angle of said mirror with respect to said support.

5. A photon storage tube high power laser system as defined in claim 2 wherein said reflecting means for directing said pulse of electromagnetic radiation out of said electromagnetic storage means comprises a first mirror fixedly secured to one end of said storage means and a rotating disk juxtaposed said first mirror, said disk having at least one protruding element thereon, said protruding element being in the form of a second mirror whereby rotation of said second mirror in front of said first mirror alters the angle of reflection of said reflective means by allowing said pulse of electromagnetic radiation to be directed either off said first mirror or said second mirror.

6. A photon storage tube high power laser system as defined in claim 1 wherein said reflecting means of said electromagnetic storage means includes at least three mirrors at one end thereof and at least two mirrors at the other end thereof whereby said pulse of electromagnetic radiation may be reflected between said plurality of mirrors.

7. A photon storage tube high power laser system as defined in claim 6 wherein said electromagnetic radiation producing means comprises a housing, said housing containing said gain medium therein, a reflective element located at one end of said housing and said adjustable reflective means located at the other end of said housing, said reflective element and said adjustable reflective means forming a resonant cavity therebetween when said adjustable reflective means is adjusted so as to be in optical alignment with and substantially parallel to said reflective element, and means for repetitively pumping said gain medium at predetermined intervals.

8. A photon storage tube high power laser system comprising at least two means, each containing a gain medium, for producing a first and a second pulse of electromagnetic radiation, respectively, means operably connected to said two electromagnetic radiation producing means for storing said first and said second pulses of electromagnetic radiation therein for a predetermined period of time, each of said electromagnetic radiation producing means including adjustable means for reflecting said pulse of electromagnetic radiation along a different path, means operably interposed between each of said adjustable reflective means and said electromagnetic radiation storage means for directing each of said pulses of electromagnetic radiation as spatially separated pulses either into said electromagnetic radiation storage means, back through said gain mediums, or out of said high power laser system as the output, said electromagnetic storage means including at least two means in optical alignment with each other for receiving said pulses of electromagnetic radiation from said directing means and reflecting therebetween each of said pulses of electromagnetic radiation, at least one of said reflecting means of said storage means being capable of redirecting each of said pulses of electromagnetic radiation at said predetermined period of time from said electromagnetic radiation storage means to said pulse directing means interposed between said adjustable reflective means and said storage means whereby said directing means can either redirect each of said pulses of electromagentic radiation through said gain mediums or out of said high power laser system as pulses of high power electromagnetic radiation.

9. A photon storage tube high power laser system as defined in claim 8 wherein said pulse directing means comprises at least two pulse directing assemblies, and one of said pulse directing assemblies being adjustable.

10. A photon storage tube high power laser system as defined in claim 9 wherein each of said pulse directing assemblies comprises a rotatable disk having at least two reflective surfaces, each of said surfaces being disposed at a different angle with respect to the other.

* * * * *